United States Patent [19]
Fujii

[11] Patent Number: 5,143,798
[45] Date of Patent: Sep. 1, 1992

[54] MAGNETO-OPTICAL RECORDING MEDIUM HAVING DOUBLE MAGNETIC LAYERS INCLUDING A LIGHT RARE EARTH ELEMENT AND SATISFYING A SPECIFIED CONDITION INVOLVING THE PRODUCT OF THE THICKNESS AND MAGNETIZATION SATURATION OF SAID LAYERS

[75] Inventor: Yoshio Fujii, Amagasaki, Japan

[73] Assignee: Mitsubishi Denki Kabushiki Kaisha, Japan

[21] Appl. No.: 820,507

[22] Filed: Jan. 14, 1992

[30] Foreign Application Priority Data

Jan. 16, 1991 [JP] Japan ................... 3-44550

[51] Int. Cl.$^5$ ............... G11B 11/12; G11B 11/10; G11B 13/04; G11B 5/66
[52] U.S. Cl. ........................... 428/694; 428/900; 369/275.2; 369/288; 369/13; 365/122; 365/34
[58] Field of Search ............. 369/13, 14, 275.2, 288; 360/59, 114; 365/122, 10, 22, 27, 29, 32, 33, 34; 428/694, 900

[56] References Cited

U.S. PATENT DOCUMENTS

| | | | |
|---|---|---|---|
| 4,293,621 | 10/1981 | Togami | 428/694 |
| 4,518,657 | 5/1985 | Yanagida | 428/694 |
| 4,556,291 | 12/1985 | Chen | 369/13 |
| 4,799,114 | 1/1989 | Tsunashima | 360/59 |
| 4,878,132 | 10/1989 | Aratani et al. | 360/59 |
| 4,955,007 | 9/1990 | Aratani et al. | 369/13 |
| 5,094,925 | 3/1992 | Ise et al. | 428/694 |

FOREIGN PATENT DOCUMENTS 2-87347  3/1990  Japan.
2-227847 9/1990 Japan.

OTHER PUBLICATIONS

Exchange-Coupled Double-Layer Tb-Fe-Co Films for Magneto-Optical Memory Fujii, et al.—J. Magn. Soc. Jpn., 11, Suppl., No. S1, 1987, pp. 329-332.
High Performance Magneto-Optical Disks Using Double Layered Tb-Fe-Co Films H. Sugahara, et al. IEEE Trans. Magn., 24, No. 6, 1988, pp. 2455-2457.
Recording Characteristics of Double-Layered TbFeCo Disk T. Tokunaga, et al. IEEE Trans. J. Magn. Jpn., 4 No. 5, 1989, pp. 278-282.
Magneto-Optical and Magnetic Properties of Exchange-Coupled TbNdFeCo Films Fujii, et al. Tech. Digest Magneto-Optical . . . symposium Apr. 1991, p. 34.
Stability of Small bits Written in Amorphous GdCo Thin Films Togami, Appl. Phys. Lett. 32, (10), May 15, 1978, pp. 673-675.
Magnetization Process of Exchange-Coupled Ferrigmagnetic Double-Layered Films Kobayashi, et al. Jpn. J. of Appl. Phys. 20, No. 11, Nov. 1981, pp. 2089-2095.
Theromagnetic Writing on Exchange-Coupled Amorphous Rare-Earth Iron . . . Tsunashima, et al. IEEE Trans. magn. MAG-17, No. 6, Nov. 1981, pp. 2840-2842.

(List continued on next page.)

Primary Examiner—Hoa Nguyen
Attorney, Agent, or Firm—Wolf, Greenfield & Sacks

[57] ABSTRACT

A magneto-optical recording medium including a first magnetic layer (having film thickness t1 and saturation magnetization Ms1) and a second magnetic layer (having film thickness t2 and saturation magnetization Ms2) which are respectively made from a rare earth-transition metal alloy and sequentially laminated on a substrate to jointly make up a recording layer. Only the first magnetic layer or both the first and second magnetic layers contain a light rare earth element. At room temperature, a transition-metal sub-lattice magnetic moment is dominant in the first magnetic layer, whereas a rare earth sub-lattice magnetic moment is dominant in the second magnetic layer, respectively. Substantially, the directions to stabilize magnetization of the first and second magnetic layers are inverse from each other and the expression shown below is satisfied.

$$t1 \times Ms1 - t2 \times Ms2 \leq 5 \; (\mu m \times emu/cm^3)$$

6 Claims, 4 Drawing Sheets

→ MAGNETIZATION
→ TRANSITION METAL SUB-LATTICE MAGNETIC MOMENT
--→ RARE EARTH SUB-LATTICE MAGNETIC MOMENT

OTHER PUBLICATIONS

Beam Addressable High-Densith Magnetic Record Film GH May IBM Technical Disclosure Bulletin 16, No. 7 Dec. 1973, pp. 2365-2366.

Magneto-Optical Characteristics of Double-Layered Amorphous RE-Fe Films By . . . Takenouchi et al. J. Appl. Phys., 55(6), Mar. 15, 1984, pp. 2164-2166.

Tbx Ndx (FeCo) 1-x-y: Promising Materials for Magneto-Optical Storage? Reim, et al. J. Appl. Phys., 61(8), Apr. 15, 1987, pp. 3349-3351.

Magneto-Optical Media with High Kerr Fotation at Short Wavelengths Iiyori, et al. Tech. digest: symposium Apr. 1991: (paper to be published) (17-R-02), p. 79.

➡ MAGNETIZATION

→ TRANSITION METAL
  SUB-LATTICE MAGNETIC MOMENT

--→ RARE EARTH
  SUB-LATTICE MAGNETIC MOMENT

TRANSITION METAL
  SUB-LATTICE MAGNETIC MOMENT

RARE EARTH

MAGNETO-OPTICAL RECORDING MEDIUM HAVING DOUBLE MAGNETIC LAYERS INCLUDING A LIGHT RARE EARTH ELEMENT AND SATISFYING A SPECIFIED CONDITION INVOLVING THE PRODUCT OF THE THICKNESS AND MAGNETIZATION SATURATION OF SAID LAYERS

BACKGROUND OF THE INVENTION

1. Field of the Invention

The present invention relates to a magneto-optical recording medium available for magneto-optical recording of data, more particularly, the invention relates to structure and material for composing magnetic recording layers of this magneto-optical recording medium.

2. Description of Related Art

Among those conventional magneto-optical recording media, there is such a magnetic recording layer composed of amorphous alloy thin film made from the combination of heavy rare earth and transition metal, such as TbFeCo or GdDyFeCo, on a transparent glass or plastic substrate having guide tracks. These conventional magnetic films respectively have about 200° C. of Curie temperature. Availing of thermal effect generated by a semiconductor laser beam having about 0.8 μm of wavelength which is condensed to about 1 μm, such conventional magnetic film generates locally inverse magnetic domain for recording and erasing data. This conventional magnetic film can reproduce data by applying those magneto-optical effects like Kerr effect or Faraday effect for example.

In order to promote recording capacity of such a magneto-optical recording medium, it is positively desired to increase recording density by contracting the condensed laser-beam diameter by means of a light source with shorter wavelength. Nevertheless, it is widely known that the shorter the wavelength of light is, the less the magneto-optical effect of the amorphous alloy thin film made from the combination of heavy rare earth and transition metal. Therefore, in order to generate a significant magneto-optical effect by applying a shorter wavelength, such material is composed of amorphous alloy film added with a light rare earth element like praseodymium (Pr), or neodymium (Nd), or cerium (Ce), for example. On the other hand, since the addition of any of these light rare earth elements to the amorphous-alloy film causes the vertical magnetic anisotropy of the magnetic film to be degraded and makes it difficult to stably generate an inverse magnetic domain, a preceding art proposes a means for backing the magneto-optical thin film so that inverse magnetic domain can more stably be retained.

For example, FIG. 1 schematically designates a sectional view of a conventional magneto-optical recording medium disclosed in the Japanese Patent application Laid-Open No. 2-87347 (1990). The reference numeral 1 shown in FIG. 1 designates a transparent substrate accommodating a reflection preventive layer 2, the first and second magnetic layers 13 and 14, and a protection layer 7, which are sequentially superimposed thereon. Of these, the first magnetic layer 13 is substantially composed of an amorphous alloy thin film made from rare earth and transition metal including light rare earth elements like cerium, praseodymium, neodymium, and samarium, or the like, and yet; having a high Curie temperature and weak magnetic coercive force. The second magnetic layer 14 is composed of an amorphous-alloy thin film made from a rare earth and transition metal having low Curie temperature and strong magnetic coercive force.

To record data on the conventional magneto-optical recording medium shown in FIG. 1 initially, such external magnetic field, weaker than the magnetic coercive force of the first magnetic layer 13 and than that of the second magnetic layer 14, is applied and then light is irradiated to the magneto-optical recording medium so as to locally raise the temperature of the recording medium. This causes the magnetism of the second magnetic layer 14 to be lost and instead, an inverse magnetic domain is generated in the first magnetic layer 13, thus permitting a data recording operation to be executed. Next, when the temperature lowers, magnetism of the second magnetic layer 14 is aligned in the direction of magnetism of the first magnetic layer 13, thus permitting a recording operation to be executed on the second magnetic layer 14. As soon as the temperature of the magneto-optical recording medium substantially lowers, due to an exchange couple with the second magnetic layer 14 having strong magnetic coercive force, the inverse magnetic domain of the first magnetic layer 13 is stably retained. Since the first magnetic layer 13 contains light rare earth elements, the first magnetic layer 13 can exert sufficient magneto-optical effect on exposure to light containing such a wavelength shorter than that of infrared semiconductor layer beam, thus providing a satisfactory reproduction effect.

Nevertheless, any of these conventional magneto-optical recording media cannot always generate a fully stable inverse magnetic domain. For example, those two kinds of magnetic-optical recording media shown in Table 1 respectively have a recording layer (shown in FIG. 1) on a plastic disc having 130mm of diameter. The first and second magnetic layers of the recording medium I are respectively composed of TbFeCo film, whereas the recording medium II contains the first magnetic layer in which part of the terbium component is replaced by neodymium. The carrier-wave to noise (C/N) ratio of the reproduced data from a disc of the recording medium III is inferior to that of the recording medium I.

TABLE 1

|  | Medium I | Medium II |
| --- | --- | --- |
| First Layer 13 Composition | $Tb_{16}Fe_{70}Co_{14}$ | $Tb_8Nd_8Fe_{70}Co_{14}$ |
| Second Layer 14 Composition | $Tb_{29}Fe_{61}Co_{10}$ | $Tb_{29}Fe_{61}Co_{10}$ |
| First Layer 13 Film Thickness | 0.025 μm | 0.025 μm |
| Second Layer 14 Film Thickness | 0.025 μm | 0.025 μm |
| First Layer 13 Saturation Magnetization | 280 emu/cm$^3$ | 360 emu/cm$^3$ |
| Second Layer 14 saturation Magnetization | 130 emu/cm$^3$ | 130 emu/cm$^3$ |
| C/N Ratio | 48.1 dB | 37.5 dB |

After visually checking the pit-form inverse magnetic domain recorded on those tested media with a polarized microscope, inventors witnessed that the recording medium I contained smooth elliptic pit-form, whereas the other recording medium II merely contained such pits devoid of smooth shape, and yet, some pits even contained those domains without being inverse-magnetized. Probably, this is because the saturation magnetization is increased in the first magnetic layer of the recording medium II as a result of the addition of the Nd component, thus causing the floating magnetic field to increase in the layer. In consequence, the first magnetic layer can not fully and stably generate and retain the inverse magnetic domain.

More particularly, in order to provide a substantial magneto-optical effect using a short wavelength, light rare earth elements are added to such a conventional magneto-optical recording medium, however, any of these conventional magneto-optical recording media cannot always constantly achieve satisfactory reproduction characteristic.

SUMMARY OF THE INVENTION

An object of the invention is to provide a novel magneto-optical recording medium which can exert a sufficient magneto-optical effect on exposure to light containing short wavelength and strengthen recording density.

Another object of the invention is to provide a novel magneto-optical recording medium which is capable of securely generating a stable inverse magnetic domain in the first magnetic layer even when the first magnetic layer contains a light rare earth element.

A still further object of the invention is to provide a novel magneto-optical recording medium containing substantial recording density and being capable of generating a satisfactory carrier-wave to noise (C/N) ratio in the course of reproducing data.

More particularly, the magneto-optical recording medium embodied by the invention is characteristically composed of the first magnetic layer (having film thickness t1 and saturation magnetization Ms1) and the second magnetic layer (having film thickness t2 and saturaton magnetization Ms2) which are respectively made from rare earth-transition metal alloy and sequentially laminated on a substrate to jointly make up a recording layer. Only the first magnetic layer or both the first and second magnetic layers contain a light rare earth element. At room temperature, a transition metal sub-lattice magnetic moment is dominant in the first magntic layer, whereas a rare earth sub-lattice magnetic moment is dominant in the second magnetic layer, respectively. Substantially, the directions to stabilize magnetization of the first and second magnetic layers are inverse from each other and the expression shown below is satisfied.

$$t1 \times Ms1 - t2 \times Ms2 \leq 5 \ (\mu m \times emu/cm_3)$$

In order to generate a substantial magneto-optical effect on exposure to light containing a short wavelength, in general, neodymium (Nd) being a light rare earth element is preferably contained in only the first magnetic layer or both the first and second magnetic layers. Generally, TbFeCo ternary amorphous magnetic alloy is made available in terms of the rare earth-transition metal alloy.

The above and further objects and features of the invention will more fully be apparent from the following detailed description with accompanying drawings.

DESCRIPTION OF THE PREFERRED EMBODIMENTS

Referring now more particularly to the accompanying drawings, the magneto-optical recording medium according to an embodiment of the invention is described below.

Figure 1:
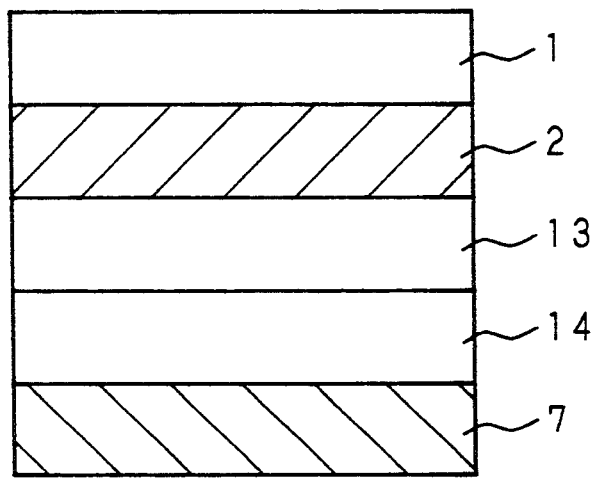
FIG. 1 schematically designates the sectional view of a conventional magneto-optical recording medium.
Figure 2:
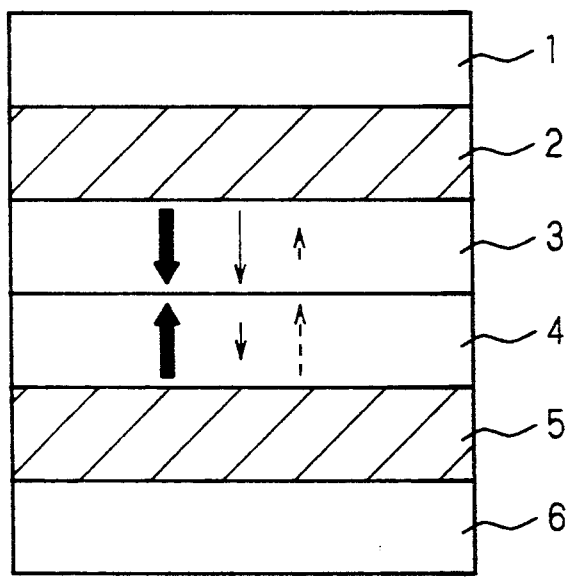
FIG. 2 schematically designates the sectional view of the magneto-optical recording medium according to an embodiment of the invention.

The reference numeral 1 shown in FIG. 2 (showing the sectional view of the magneto-optical recording medium according to an embodiment of the invention) designates a transparent substrate (made from polycarbonate resin) having 130mm of outer diameter. A plurality of layers are sequentially laminated on the transparent substrate 1 including the following; a reflection preventive layer 2 which is composed of a silicone-nitride film, the first magneticc layer 3 and the second magnetic layer 4 respectively being composed of a thin film of rare earth-transition metal amorphous alloy, a transparent dielectric layer 5 composed of a silicone-nitride film, and a reflection layer 6 composed of an aluminum film. The magnetization, the transition metal sub-lattice magnetic moment and the rare earth sub-lattice moment of the first and second magnetic layers 3 and 4 are respectively shown in FIG. 2 by means of thick arrowed lines, thin arrowed lines and dotted arrowed lines, respectively.

As a result of the generation of the magnetic exchange coupling effect, those sub-lattice magnetic moments of the first and second magnetic layers 3 and 4 are oriented in the identical direction. In this case, the transition metal sub-lattice moment is dominant in the first magnetic layer 3, whereas the rare earth sub-lattice moment is dominant in the second magnetic layer 4. In consequence, as shown in FIG. 2, the directions of stabilizing the magnetization of the first and second magnetic layers 3 and 4 are inverse from each other. The total magnetization of the whole recording layer is expressed by the difference between magnetization of the first magnetic layer 3 and that of the second magnetic layer 4.

Table 2 designates an example of the result of the evaluation of the carrier-wave to noise (C/N) ratio of the reproduced data after completing a recording and a reproduction process on and from a variety of magneto-optical recording media including the first and second magnetic layers 3 and 4 containing a variety of film thickness including t1 and t2 ($\mu$m) and saturation magnetization Ms1 and Ms2 (emu/cm$^3$). For comparison, Table 2 also presents the result of the evaluation of those recording media that failed to satisfy the requisite "t1$\times$Ms1$-$t2$\times$Ms2$\leq$5 ($\mu$m$\times$emu/cm$^3$)" providing asterisks (*) to the column of (t1$\times$Ms1$-$t2$\times$Ms2). Note that those units including x, y, z (at %), t ($\mu$m), and Ms (emu/cm$^3$) are applied.

TABLE 2

| Medium | First Magnetic Layer 3 $Tb_xNd_yFe_zCo_{100-x-y-z}$ | | | | | Second Magnetic Layer 4 $Tb_xNd_yFe_zCo_{100-x-y-z}$ | | | | | t1Hs1 − t2Hs2 [μm · emu/cm³] *: beyond 5 | C/N Ratio [dB] |
|---|---|---|---|---|---|---|---|---|---|---|---|---|
| | x | y | z | t1 | Ms1 | x | y | z | t2 | Ms2 | | |
| 1a | 4  | 12 | 70 | 0.025 | 400 | 29 | 0 | 61 | 0.025 | 130 | *6.75 | 27.5 |
| 1b | 6  | 10 | 70 | 0.025 | 380 | 29 | 0 | 61 | 0.025 | 130 | *6.25 | 35.1 |
| 1c | 8  | 8  | 70 | 0.025 | 360 | 29 | 0 | 61 | 0.025 | 130 | *5.75 | 37.5 |
| 1d | 10 | 6  | 70 | 0.025 | 310 | 29 | 0 | 61 | 0.025 | 130 | 4.50  | 51.7 |
| 1e | 12 | 4  | 70 | 0.025 | 280 | 29 | 0 | 61 | 0.025 | 130 | 3.75  | 51.1 |
| 1f | 14 | 2  | 70 | 0.025 | 230 | 29 | 0 | 61 | 0.025 | 130 | 2.50  | 54.8 |
| 1g | 12 | 4  | 60 | 0.025 | 290 | 29 | 0 | 61 | 0.025 | 130 | 4.00  | 52.2 |
| 1h | 12 | 4  | 50 | 0.025 | 340 | 29 | 0 | 61 | 0.025 | 130 | *5.25 | 43.1 |
| 1i | 12 | 4  | 50 | 0.015 | 340 | 29 | 0 | 61 | 0.025 | 130 | 1.70  | 53.3 |
| 1j | 12 | 4  | 50 | 0.010 | 340 | 29 | 0 | 61 | 0.025 | 130 | 0.05  | 52.6 |
| 1k | 12 | 4  | 50 | 0.025 | 340 | 29 | 0 | 61 | 0.030 | 130 | 4.60  | 53.4 |
| 1l | 12 | 4  | 50 | 0.025 | 340 | 29 | 0 | 61 | 0.035 | 130 | 3.95  | 50.0 |
| 1m | 12 | 4  | 50 | 0.025 | 340 | 29 | 0 | 70 | 0.035 | 60  | *6.40 | 33.1 |
| 2a | 4  | 12 | 70 | 0.025 | 400 | 26 | 5 | 64 | 0.035 | 80  | *7.20 | 25.7 |
| 2b | 6  | 10 | 70 | 0.025 | 380 | 26 | 5 | 64 | 0.035 | 80  | *6.70 | 27.5 |
| 2c | 8  | 8  | 70 | 0.025 | 360 | 26 | 5 | 64 | 0.035 | 80  | *6.20 | 35.9 |
| 2d | 10 | 6  | 70 | 0.025 | 310 | 26 | 5 | 64 | 0.035 | 80  | 4.95  | 48.6 |
| 2e | 12 | 4  | 70 | 0.025 | 280 | 26 | 5 | 64 | 0.035 | 80  | 4.20  | 51.8 |
| 2f | 14 | 2  | 70 | 0.025 | 230 | 26 | 5 | 64 | 0.035 | 80  | 2.95  | 52.2 |
| 2g | 12 | 4  | 60 | 0.025 | 290 | 26 | 5 | 64 | 0.035 | 80  | 4.45  | 50.4 |
| 2h | 12 | 4  | 50 | 0.025 | 340 | 26 | 5 | 64 | 0.035 | 80  | *5.70 | 39.7 |
| 2i | 12 | 4  | 50 | 0.015 | 340 | 26 | 5 | 64 | 0.035 | 80  | 2.30  | 53.7 |
| 2j | 12 | 4  | 50 | 0.010 | 340 | 26 | 5 | 64 | 0.035 | 80  | 0.60  | 52.1 |
| 2k | 12 | 4  | 50 | 0.025 | 340 | 26 | 5 | 64 | 0.040 | 80  | *5.30 | 42.3 |
| 2l | 12 | 4  | 50 | 0.025 | 340 | 26 | 5 | 64 | 0.050 | 80  | 4.50  | 53.0 |
| 2m | 12 | 4  | 50 | 0.025 | 340 | 26 | 5 | 69 | 0.050 | 60  | *5.50 | 43.1 |

Figure 3:
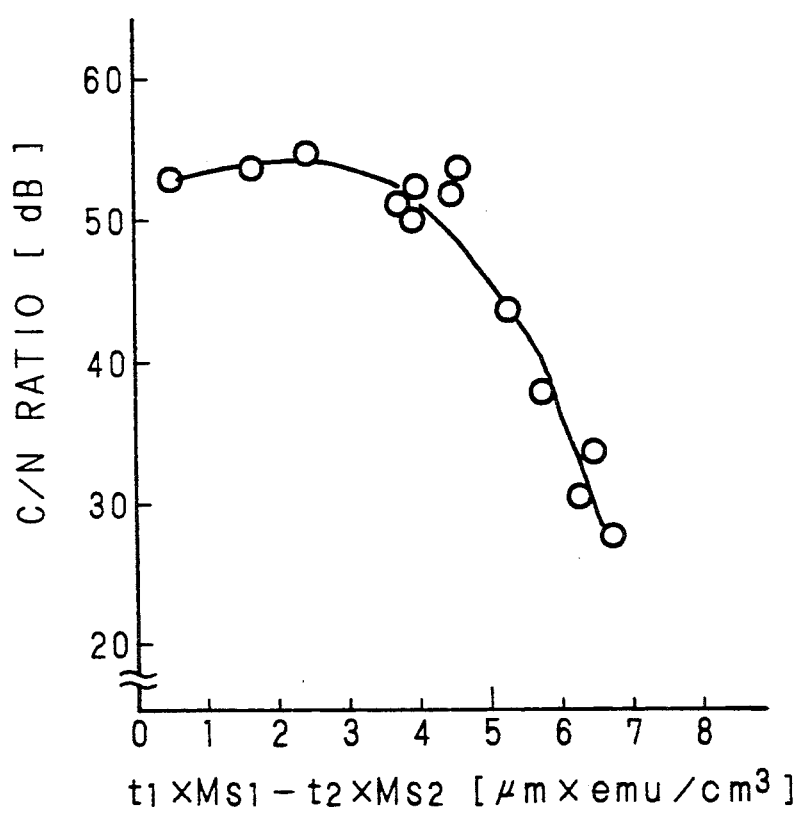
FIG. 3 graphically designates the recording and reproduction characteristics of the magneto-optical recording medium according to an embodiment of the invention.
Figure 4:
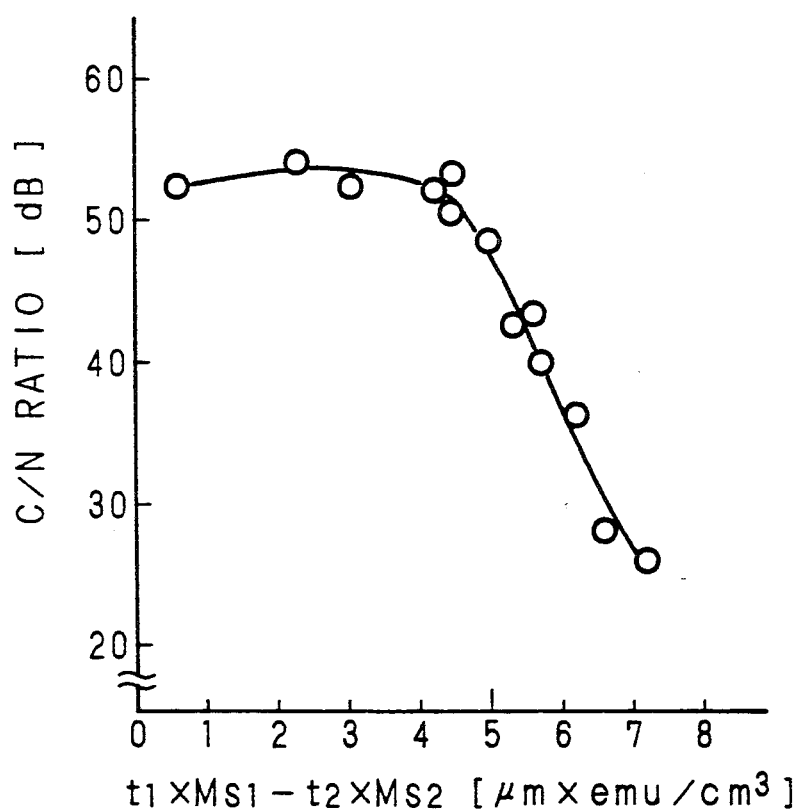
FIG. 4 graphically designates the recording and reproduction characteristics of the magneto-optical recording medium according to another embodiment of the invention.

Only the first magnetic layers 3 of those recording media 1a through 1m respectively contain neodymium which is a light rare earth element, whereas the first and second magnetic layers 3 and 4 of those recording media 2a through 2m respectively contain neodymium. FIGS. 3 and 4 graphically designate the relationship between the condition "t1× Ms1−t2×Ms2" and the C/N ratio of the reproduced data per type of recording medium. Speaking of these recording media, when the value of the condition "t1×Ms1−t2×Ms2" being the difference between the products of the thickness and the saturation magnetization of the first magnetic layer 3 and the second magnetic layer 4 exceeds the numeral 5, then the C/N ratio of the reproduced data inclines to decrease. On the other hand when the expression "t1×Ms1−t2×Ms2≦5" is fully satisfied, satisfactory C/N ratio is obtained, which incurs no problem to practical application.

After visually checking the pit-form inverse magnetic domain on the tested recording media with a polarized microscope, inventors witnessed that those pits of the recording media generating satisfactory C/N ratio maintained a smooth elliptic shape. Conversely, those pits of the tested recording media failing to satisfy the expression "t1×Ms1−t2×MS2≦5" had an irregularly shaped external configuration, and yet, there were some domains that failed to generate inverse magnetism in their pits.

Based on those results of the evaluation described above, it is expressly clear that the magneto-optical recording medium embodied by the invention capable of fully satisfying the expression "t1×Ms1−t1×Ms2≦5" minimizes the floating magnetic field of the magnetic layers to a practically ignorable level and stably executes the recording operations without raising obstacle to properly retain the shape of the inverse magnetic domains.

The above description has soley referred to the use of neodymium (Nd) as the typical example of an available light rare earth element. However, the embodiment of the invention also makes use of either praseodymium (Pr), or cerium (Ce), or samarium (Sm), or the combination of those which are selected from four of these light rare earth elements. Likewise, the above description has soley referred to the use of terbium (Tb) as the typical example of a heavy rare earth element. However, according to the test result, even when applying either dysprosium (Dy) or gadolinium (Gd) or the combination of those which are selected from three of these heavy rare earth elements proved to generate quite satisfactory results identical to those which are described in the preceding section.

As in the invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A magneto-optical recording medium comprising;
   a substrate;
   a first magnetic layer which is composed of a rare earth-transition metall alloy and contains a light rare earth element, and in which a transition metal sub-lattice magnetic moment is dominant at room temperature; and
   a second magnetic layer which is composed of a rare earth-transition metal alloy, and in which a rare earth sub-lattice magnetic moment is dominant at room temperature;
   wherein the directions to stabilize magnetization of said first and second magnetic layers are inverse from each other; and wherein an expression shown below is satisfied.

$$t1 \times Ms1 - t2 \times Ms2 \leq 5 (\mu m \times emu/cm^3)$$

wherein
- t1 (μm): Film thickness of said first magnetic layer
- t2 (μm): Film thickness of said second magnetic layer
- Ms1 (emu/cm³): Saturation magnetization of said first magnetic layer
- Ms2 (emu/cm³): Saturation magnetization of said second magnetic layer 2. A magneto-optical recording medium as set forth in claim 1, wherein said light rare earth element is one selected from a group consisting of neodymium (Nd), praseodymium (Pr), cerium (Ce) and samarium (Sm).

3. A magneto-optical recording medium as set forth in claim 1, wherein said rare earth-transition metal alloy is TbFeCo ternary amorphous magnetic alloy.

4. A magneto-optical recording medium comprising;
- a substrate;
- a first magnetic layer which is composed of a rare earth-transition metal alloy and contains a light rare earth element, and in which a transition metal sub-lattice magnetic moment is dominant at room temperature; and
- a second magnetic layer which is composed of a rare earth-transition metal alloy and contains a light rare earth element, and in which a rare earth sub-lattice magnetic moment is dominant at room temperature;

wherein the directions to stabilize magnetization of said first and second magnetic layers are inverse from each other; and wherein an expression shown below is satisfied.

$$t1 \times Ms1 - t2 \times Ms2 \leq 5 \text{ (micrometer} \times \text{emu/cm}^3)$$

wherein
- t1 (μm): Film thickness of said first magnetic layer
- (μm): Film thickness of said second magnetic layer
- Ms1 (emu/cm³): Saturation magnetization of said first magnetic layer
- Ms2 (emu/cm³): Saturation magnetization of said second magnetic layer 5. A magneto-optical recording medium as set forth in claim 4, wherein said light rare earth element is one selected from a group consisting of neodymium (Nd), praseodymium (Pr), cerium (Ce) and samarium (Sm).

6. A magneto-optical recording medium as set forth in claim 4, wherein said rare earth-transition metal alloy is TbFeCo ternary amorphous magnetic alloy.

* * * * *